Aug. 5, 1952 J. A. DUVOISIN 2,605,647

INTERMITTENT MECHANISM

Filed March 4, 1950

INVENTOR.
JEAN A. DUVOISIN
BY H. S. Mackey
ATTORNEY

Patented Aug. 5, 1952

2,605,647

UNITED STATES PATENT OFFICE 2,605,647

INTERMITTENT MECHANISM

Jean A. Duvoisin, Briarcliff Manor, N. Y., assignor to General Precision Laboratory Incorporated, a corporation of New York Application March 4, 1950, Serial No. 147,747

4 Claims. (Cl. 74—436)

This invention pertains to a motion picture projector intermittent mechanism particularly adapted for use where motion picture images are converted to television images.

The televising of a motion picture film presents two principal problems: the first being the reconciliation of the television field frequency of 60 per second with the standard motion picture speed of 24 frames per second, and the second being the illumination of the television pick-up or transmitting tube at only such times and for such durations as required by its inherent mode of operation.

This second problem arises as the result of the internal characteristics of those types of television pick-up tubes which are in most general use. When such a tube is used the scene to be televised is focused upon a screen or mosaic within the tube, and a cathode ray beam scans the mosaic, converting the electric charges stored on successive elements of the mosaic representing light intensities to electrical voltages in an output circuit. At the end of each vertical scan the cathode ray beam is caused to return to its starting point to start the next vertical scan, and this operation of return takes a certain minimum time, called the fly-back time.

When a live scene is televised, it is continuously focused upon the mosaic, but when images derived from a motion picture film are impressed on the mosaic the light must be interrupted at intervals to permit the film to be advanced or pulled down. To obviate spotty effects as a result of the required intermittent illumination it is usual when using such pick-up tubes to illuminate the mosaic only during the fly-back time and to completely cut off the light transmitted from the motion picture film during all of the periods that the cathode ray beam is scanning the mosaic. This time pattern of light transmission and cut-off demands a shutter that opens only during the fly-back time and remains closed during the electronic scanning time. These fly-back times are short, however, and occur regularly sixty times a second, so that if the standard motion picture 90° pull-down intermittent mechanism were to be used, every fifth exposure by the shutter would occur during a film pull-down period. One of the ways suggested for solving this problem is to pull the film down at alternately long and short intervals, the average occurrence thereof being at the standard motion picture frequency of 24 pull-downs per second.

The purpose of the instant invention is to provide a simple mechanism which advances the motion picture film intermittently at intervals which are alternatively long and short, these long and short intervals having values suitable for use in motion picture television and the average length thereof being equal to the desired motion picture frame period.

It is an additional purpose of the invention to provide an intermittent mechanism suitable for the production of television images from motion picture film wherein the pull-down time is not decreased over that which has become more or less standard, namely, a 90° pull-down. Thus excessive strains on the film strip itself may be avoided.

Briefly, the intermittent mechanism of the instant invention consists of a pin cam driving a four-slot star wheel, the combination being similar to a standard Geneva movement except that the pin cam is provided with two pins. This star wheel is in turn made to drive a second similar two-pin cam meshing with a second similar four-slot wheel and the desired intermittent motion is derived from an output shaft connected to the second star wheel. Thus in essence the mechanism may be said to be two modified Geneva movements connected in tandem, cooperating to produce a new result useful in televising motion pictures.

A more complete understanding of this invention may be secured from the detailed description and the drawings, in which.

Figures 1, 2:
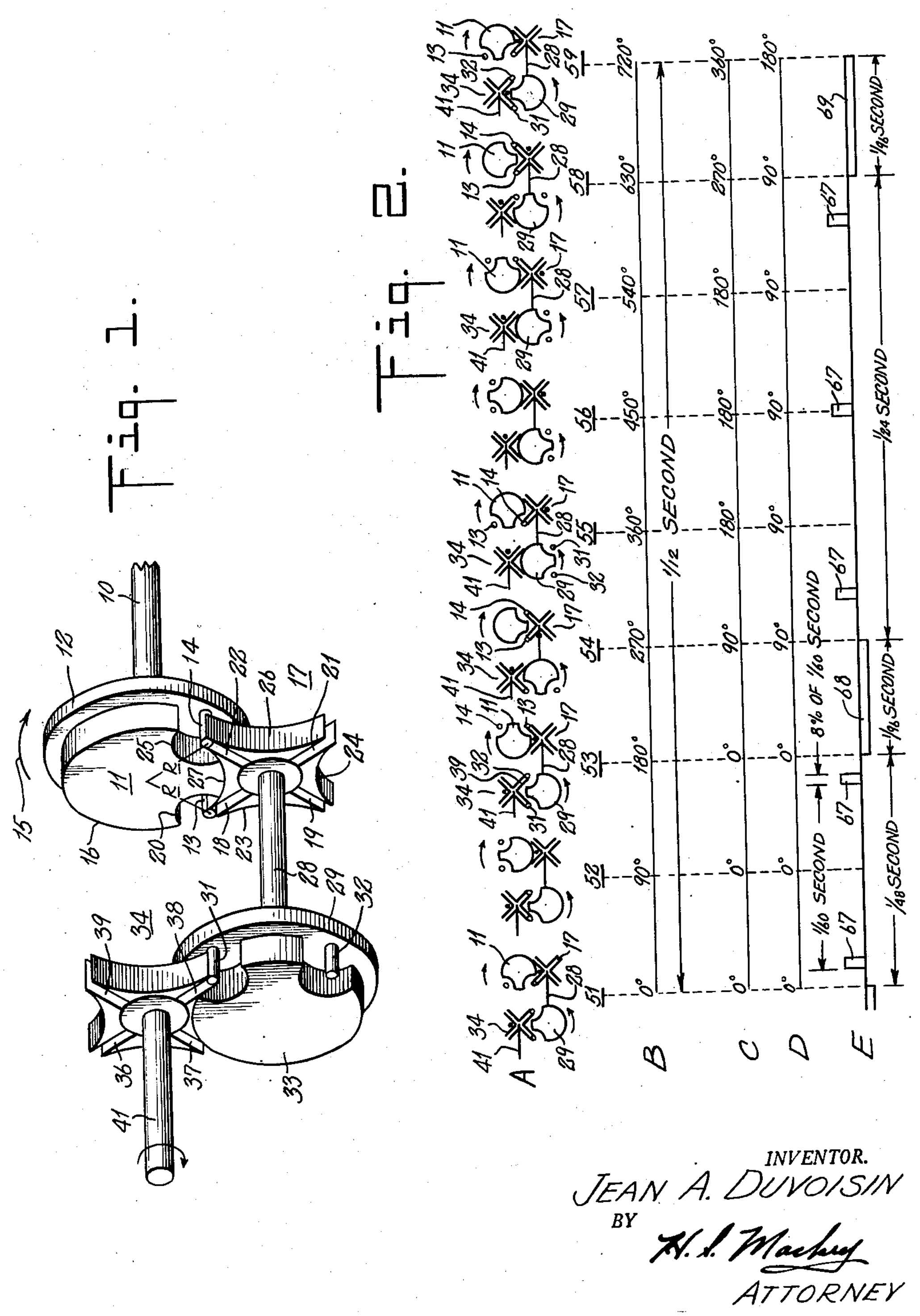
Figure 1 is a view illustrating the intermittent mechanism of the invention.
Figure 2 is a graph illustrating the operation of the invention.

Referring now to Figure 1, a shaft 10 is driven by the usual drive mechanism of a motion picture projector (not shown) and is rotated at the constant speed of 1440 revolutions per minute which is standard for motion picture projector drive shafts, thus imparting that speed to a pin cam 11 connected to the shaft 10. The pin cam 11 is in the general form of a disc fastened to the end of the shaft 10 with their axes aligned. The pin cam 11 is provided with a base 12 from which project two pins 13 and 14 in a direction parallel to the axis of the cam 11. The pins 13 and 14 are positioned at equal radial distance R from the axis of the pin cam and are spaced circumferentially by 90°. The base 12 also bears a locking disc 16 having a radius approximately equal to the radial distance R. This disc 16 is concentric with the base 12 and has a circular outline except for two relieved portions or recesses 26 and 25 at the location of the pins 13 and 14 to obviate interference between the disc 16 and the cooperating star wheel.

The pin cam 11 is designed and positioned to drive a Geneva gear or star wheel 17 having four radial slots 18, 19, 21 and 22. The pin cam 11 is rotated clockwise as indicated by the arrow 15, and in the position depicted the pin 13 is leaving the star wheel slot 18 and the pin 14 is about to enter the slot 22. During the ensuing rotation of 90° the pin cam 12 drives the star wheel 17 by engagement of the pin 14 with the slot 22 so that the star wheel 17 also is rotated by the same amount of 90°. In general, during rotation of the pin cam through 90° arcs in which either pin 13 or pin 14 engages a star wheel slot, the star wheel is rotated in a like manner through a 90° arc, but at all other times the convex locking disc 16 engages one of the four concave locking recesses 23, 24, 26 and 27 of the star wheel 17, positively holding the star wheel 17 stationary while the pin cam continues to rotate.

The star wheel 17 is rigidly attached by a countershaft 28 to a second pin cam 29 similar to the first pin cam 11 and like it provided with a locking disc 33 and two pins, 31 and 32, angularly spaced 90° relative to each other. The second pin cam 29 is so attached to the star wheel 17 that their orientation or relative phase is as shown in Figure 1, that is, the angular positions of the two pins coincide with the angular positions of two adjacent slots of the star wheel 17.

The pin cam 29 drives a second four-slot star wheel 34 similar in all respects to the star wheel 17 and having four slots, 36, 37, 38 and 39 positioned for engagement by the pins 31 and 32 of the pin cam 29. This star wheel has connected thereto an output shaft 41 that communicates the intermittent movement of the star wheel 34 to a motion picture film sprocket drum (not shown).

As indicated in the drawings the pin cam 11 and star wheel 17 combination is so phased as respects the pin cam 29 and star wheel 34 combination, that at the time the second pin 14 of the pin cam 11 just disengages a slot in its associated star wheel, the pin cam 29 is so oriented that the 90° sector between the pins 31 and 32 either faces directly toward the output shaft 41 or directly away therefrom.

Obviously the manner of operation of the intermittent mechanism will not be affected in any way if the interrelationships of the parts as depicted in Figure 1 be changed by rotating the cam 12 and star wheel 17 as a unit for any fraction of a revolution about the countershaft 28 in relation to the cam 29 and star wheel 34 as a unit. The relative phase of the output and input shafts will not be disturbed by this rotation if the positions of rest of the pins 31 and 32 are maintained at their positions of joint nearest approach to and furthest recession from the output shaft.

The full sequence of motion of both pairs of pin cam and star wheel for two revolutions of the input shaft, composing a full cycle of intermittent motion may be best understood by reference to the illustration of Fig. 2, in which each of the nine representations at the top of the figure, denoted by the reference character A, schematically represents the intermittent mechanism of Fig. 1. These nine representations from left to right illustrate the positions of the mechanism for eight different positions of the input shaft 10; each position being displaced 90° from the preceding position as is denoted on a scale B below the figures. Since the rotation of the input shaft 10, Figure 1, is at an unchanging speed, the length of the degree scale B also is proportional to time duration and is so marked, the interval between the left end of the line and the right end being $\frac{1}{12}$ second. This time duration corresponds to 720° of input shaft rotation, the input shaft having a speed of 24 revolutions per second.

In Fig. 2 at A similar reference numerals are used to designate the similar elements as illustrated in Fig. 1 and the rotational positions of the star wheels 17 and 34 are made more clearly apparent by the use of a reference dot located in one sector of each.

The first three representations, 51, 52 and 53 at the left of Figure 2 at A indicate two motions of 90° each of the driving pin cam 11 with no resultant motion of any other part of the intermittent mechanism, the two pins of the cam not being in contact with the star wheels 17 during this 180° input shaft motion and, in fact, throughout this period the star wheel 17 is locked motionless in a positive manner by the locking disc of the driving pin cam 11. However, at the instant and position depicted by the representation 53, the driving pin cam locking disc has revolved to the point where it unlocks the star wheel and the pin 13 has revolved to the point where it commences to engage a slot of the star wheel 17. During the next 90° of input motion, therefore, the pin cam 11 drives the star wheel 17 through engagement of the pin 13, and the star wheel 17, countershaft 28 and pin cam 29 likewise turn through 90°. However, at the beginning of this action as depicted in representation 53 the cam pin 32 is in contact with the slot 39 of the star wheel 34, so that the counterclockwise rotation of the pin cam 29 through 90° causes rotation of the star wheel 34 through an equal angle. The positions at the end of the 90° input shaft movement are indicated in the representation 54, in which the pin 13 has advanced 90° and is about to leave the star wheel slot. The pin 32 of the pin cam 29 has also advanced 90° and is about to leave the star wheel 34, so that the output shaft 41 has advanced 90° between the representations 53 and 54. Further input shaft rotation of 90° results in the positions of representation 55, in which the pin 14 has advanced 90°, carrying the star wheel 17 and pin cam 29 with it, but although the pin cam 29 advances, it does not advance the output star wheel 34 because the pins of the pin cam 29 have left contact with the star wheel 34.

Further rotation of the input shaft and attached pin cam through 180° as indicated in representations 56 and 57 cause no motion of any other part of the intermittent mechanism but during the time accruing between representations 57 and 58 the pin 13 of the pin cam 11 drives the star wheel 17 through 90°, rotating the countershaft 28 and pin cam 29 a like amount. However, since the pins of the pin cam 29 are not in position to engage the star wheel 34, no motion is imparted to the output shaft.

The 90° rotation of the input shaft occurring between the representations 58 and 59 again rotates the star wheel 17, the countershaft 28 and the pin cam 29 by the driving action of the pin 14. Since in representation 58 the pin 31 is at the position of initial contact with the star wheel 34, the latter is driven through 90°, resulting in 90° rotation of the output shaft 41.

These successive movements of the input shaft lead to two movements of 180° each of the countershaft 28 as indicated on the scale C, occurring between the input rotational positions of 180° and 360°, and of 540° and 720°. During the first part of the first countershaft movement, or between 180° and 270°, an output shaft displacement of 90° is produced, and during the latter part of the second countershaft movement, or between 630° and 720°, another output shaft displacement of 90° is produced, both illustrated in scale D. Since the last representation 59 shows all parts of the intermittent mechanism in the same positions as in the first representation 51, the cycle depicted in Fig. 2 at A is complete and is repeated by any further rotations of the input shaft. The two angular displacements of the output shaft occurring in the cycle of operation are each of 90°, but the angular distances separating them are unequal, being 180° and 360° or on a time designation, the output shaft rests for a first period of $\frac{1}{48}$ second and a second period of $\frac{1}{24}$ second in each cycle.

This one complete cycle of operation includes two equal periods of output shaft rotation or film pull-down separated by unequal periods of time and because of this fact the mechanism may be readily adapted as a film actuating movement when television images are to be produced from the photographic record of the film strip.

As heretofore stated the light is impressed on the television transmitting tube during the retrace or fly-back time and these intervals occur once every $\frac{1}{60}$ of a second and occupy about 8% of the time allowed for one television scan. On the time scale depicted at E of Fig. 2 the fly-back time, during which the television transmitting tube is illuminated by light projected through the film strip and during which time the film must be stationary, is illustrated by the rectangle 67. The time during which the film is in motion is illustrated by the rectangle 68 occurring between representations 53 and 54 and again by the rectangle 69 occurring between representations 58 and 59, both periods of motion lasting for the standard 90° pull-down or $\frac{1}{96}$ second. It will be observed, then that in each complete cycle there are first two periods when the television transmitting tube is illuminated by the image of one frame of the motion picture film followed by three periods in which the television transmitting tube is illuminated by the image of the next succeeding motion picture frame. Thus for television purposes the motion picture frames are scanned alternately two and three times while at the same time the film strip is advanced by a simple relatively inexpensive mechanism at speeds of pull-down which may be tolerated without developing undue stresses or requiring undue refinements of mechanism.

What is claimed is:

1. An intermittent mechanism comprising, a continuously rotating drive shaft, a countershaft, means interposed between said drive shaft and said countershaft for rotating said countershaft one-half revolution during one-half of a revolution of said drive shaft and maintaining said countershaft stationary during the remaining half revolution of said drive shaft, a driven shaft, means interposed between said countershaft and said driven shaft for rotating said driven shaft one-quarter of a revolution during each half revolution of said countershaft and for maintaining said driven shaft stationary during the remainder of the time.

2. An intermittent mechanism comprising, a continuously rotating drive shaft, a countershaft, Geneva movement means interconnecting said drive shaft and said countershaft for causing said countershaft to rotate a half revolution during alternate half revolutions of said drive shaft and maintaining said countershaft stationary during the remainder of the revolution of said drive shaft, a driven shaft, second Geneva movement means interconnecting said countershaft and said driven shaft imparting rotation to said driven shaft during the initial portions of alternate half revolutions of said countershaft and the final portions of the remaining half revolutions of said countershaft and maintaining said driven shaft stationary during the remainder of the time.

3. An intermittent mechanism comprising, a continuously rotating drive shaft, a countershaft, Geneva movement means interconnecting said drive shaft and said countershaft for causing said countershaft to rotate a half revolution during alternate half revolutions of said drive shaft and maintaining said countershaft stationary during the remainder of the revolution of said drive shaft, a driven shaft, second Geneva movement means interconnecting said countershaft and said driven shaft for causing said driven shaft to rotate a quarter revolution during the initial half of alternate half revolutions of said countershaft and to rotate a quarter revolution during the final half of the remaining half revolutions of said countershaft.

4. An intermittent mechanism comprising, a continuously rotating drive shaft, a countershaft, means interconnecting said drive shaft and said countershaft for imparting a half revolution to said countershaft on alternate half revolutions of said drive shaft and for maintaining said countershaft stationary during the remaining half revolutions of said drive shaft, a driven shaft, means interconnecting said countershaft and said driven shaft for imparting a quarter revolution to said driven shaft during one-quarter revolution of alternate half revolutions of said countershaft and for imparting a further quarter revolution to said driven shaft during the other quarter revolution of the remaining half revolutions of said countershaft and for maintaining said driven shaft stationary at all other times.

JEAN A. DUVOISIN.

REFERENCES CITED

The following references are of record in the file of this patent:

UNITED STATES PATENTS

| Number | Name | Date |
|---|---|---|
| 1,166,453 | Gaumont | Jan. 4, 1916 |
| 1,167,854 | Stineman et al. | Jan. 11, 1916 |
| 1,174,249 | Gall | Mar. 7, 1916 |
| 1,383,006 | Minue | June 26, 1921 |
| 1,825,442 | Chambon | Sept. 29, 1931 |